United States Patent
Fluck et al.

(10) Patent No.: US 7,128,473 B2
(45) Date of Patent: Oct. 31, 2006

(54) OPTICAL WAVEGUIDE COUPLING

(75) Inventors: Daniel Fluck, Embrach (CH); Miguel Juan Flores, Lachen (CH)

(73) Assignee: DVL Lasers and Electronics GmbH, Stäfa (CH)

( * ) Notice: Subject to any disclaimer, the term of this patent is extended or adjusted under 35 U.S.C. 154(b) by 88 days.

(21) Appl. No.: 10/416,821

(22) PCT Filed: Nov. 8, 2001

(86) PCT No.: PCT/CH01/00656

§ 371 (c)(1),
(2), (4) Date: Oct. 27, 2003

(87) PCT Pub. No.: WO02/39152

PCT Pub. Date: May 16, 2002

(65) Prior Publication Data

US 2005/0147347 A1    Jul. 7, 2005

(30) Foreign Application Priority Data

Nov. 10, 2000 (CH) .................................. 2190/00
Nov. 17, 2000 (CH) .................................. 2246/00

(51) Int. Cl.
*G02B 6/36* (2006.01)
*G02B 6/38* (2006.01)
*G02B 6/32* (2006.01)

(52) U.S. Cl. ................. 385/90; 385/16; 385/24; 385/88

(58) Field of Classification Search ............. 385/16, 385/24, 90, 88
See application file for complete search history.

(56) References Cited

U.S. PATENT DOCUMENTS 3,954,338 A    5/1976   Hennel et al.
4,087,155 A    5/1978   Deacon
4,130,344 A    12/1978  Lemonde (Continued)

FOREIGN PATENT DOCUMENTS

| DE | 911 549 | 5/1954 |
|---|---|---|
| DE | 21 58 588 B2 | 11/1971 |
| EP | 0 443 454 A2 | 6/1991 |
| EP | 0 198 657 B1 | 7/1994 |
| EP | 0 682 280 A1 | 11/1995 |
| EP | 0 877 268 A2 | 11/1998 |
| WO | WO 01/16635 A1 | 3/2001 |

OTHER PUBLICATIONS

Shah, V. et al "Packaging Technology for High-Power, Singlemode-Fiber-Pigtailed Pump Laser Modules for Er-Doped Fiber Amplifiers",*Proceedings of the Electronic Components and Technology Conference (ECTC)*, San Diego, CA pp. 842-847 (May 18-20, 1992).

*Primary Examiner*—John D. Lee
*Assistant Examiner*—Rhonda S. Peace
(74) *Attorney, Agent, or Firm*—Victor N. King; Speckman Law Group PLLC

(57) ABSTRACT

The device (V) serves the optical coupling of a light-beam (L) arriving from any optical component with a further-transmitting light-guiding fiber (F). It contains in each case an input-side and output-side coupling body (1,2) with in each case a centric lead-through (13, 22) for leading through the light (L) wherein in the device (V) there is arranged at least one lens (40) or a lens system. Between the input-side (1) and the output-side coupling body (2) there is arranged an intermediate coupling body (3) with a centric lead-Through (34), which in one of the input-side or output-side coupling bodies (1,2) is displaceably and lockably held in a plane, whilst the outer input-side or output-side coupling bodies (1,2) in the intermediate coupling body (3) is counted in an elastically (25) pivotally movable and axially displaceable manner. The device (V) permits a separate angular adjustment or parallel displacement of the input-side and output-side coupling bodies (1, 2) relative to one another.

17 Claims, 3 Drawing Sheets

U.S. PATENT DOCUMENTS

| | | | |
|---|---|---|---|
| 4,265,511 A | 5/1981 | Nicia et al. | |
| 4,296,999 A | 10/1981 | Mead | |
| 4,447,119 A | 5/1984 | Beasley | |
| 4,579,418 A | 4/1986 | Parchet et al. | |
| 4,641,915 A | 2/1987 | Asakawa et al. | |
| 4,690,487 A | 9/1987 | Hale et al. | |
| 4,889,406 A * | 12/1989 | Sezerman | 385/35 |
| 4,953,941 A | 9/1990 | Takahashi | |
| 4,997,254 A | 3/1991 | Ganev | |
| 5,095,517 A * | 3/1992 | Monguzzi et al. | 385/90 |
| 5,163,114 A | 11/1992 | Hendow | |
| 5,208,888 A * | 5/1993 | Steinblatt et al. | 385/90 |
| 5,455,880 A | 10/1995 | Reid et al. | |
| 5,563,971 A | 10/1996 | Abendschein | |
| 5,638,472 A | 6/1997 | Van Delden | |
| 5,937,123 A | 8/1999 | Frelier | |
| 6,276,843 B1 * | 8/2001 | Alcock et al. | 385/90 |
| 6,280,098 B1 | 8/2001 | Alcock et al. | |
| 6,351,593 B1 | 2/2002 | Pollack et al. | |
| 6,371,628 B1 | 4/2002 | Ward | |
| 6,439,778 B1 | 8/2002 | Cairns | |
| 6,773,170 B1 * | 8/2004 | Georgiev et al. | 385/90 |
| 6,918,269 B1 * | 7/2005 | Wang | 65/407 |
| 6,935,791 B1 * | 8/2005 | Ban et al. | 385/90 |

* cited by examiner

OPTICAL WAVEGUIDE COUPLING

FIELD OF THE INVENTION

The present invention relates to a device for the optical coupling of a light beam arriving from any optical component with a further-transmitting, light-guiding fiber.

BACKGROUND OF THE INVENTION

The transmission of information and energy by way of light, which is transmitted via fiberglass guides, has been known for more than 30 years. The transmission by way of a complete fiber bundle is effected usually only over very short distances, whereas information may be led over large distances via a single glass-fiber line. At the same time several coupling locations occur, specifically on the one band for supplying the light beam into tie fiber and on the other hand at various connection locations at which a coupling from fiber to afar is effected. Each coupling of course entails a certain loss of energy. The best possible coupling between two fibers is achieved in that the ends of both fibers are polished into smooth surfaces and we pressed onto one another in a planar manner. This type of correction demands a highly accurate equipping and is only suitable for permanent connections.

For the releasable coupling of a light transmission a collimated light beam is fed into a further-transmitting light fiber by way of a focusing lens or a focusing lens system. For a transmission at the coupling location which is as loss-free as possible one must ensure that a highly exact axially flush alignment of the arriving light beam with the lightguide transmitting the light further is possible. This may be achieved in the most varied of manners. From U.S. Pat. No. 4,087,155 there is for example known a plug connection for this in which a fiber-to-fiber coupling is realized in which the fibers to be coupled may be directly led exactly to one another without optical lens systems. Each individual fiber at the same time rests between at least three elastically mounted spherical balls which may be slightly displaced on coupling.

U.S. Pat. No. 4,296,999 shows a completely different solution. Here two coupling bodies are connected to one another as exactly and rigidly as possible, wherein one assumes that as a result practically no axial displacement from the centered position occurs. Each fiber of this connection is in each case connected to a lens or to a lens system, and the lenses or lens systems may be moved to one another or away from one another in the axial direction (z-direction), for the purpose of focusing.

The document EP-B-0,198,657 is particularly fundamental, in which there are described and illustrated devices for optical coupling between the light source and the light-guiding fiber as well as couplings between two light-guiding fibers. At the same time there are disclosed two basic principles. In one case at least one lightguide with a focusing lens is held in a sleeve, and this sleeve is held in a coupling tube with the intermediate arrangement of rubber-elastic, flexible tubing pushed over the sleeve. By way of screws acting radially on the sleeve, this may be displaced in the radial directions (x- and y-direction), by which means one may set an angular alignment to the second, fixedly arranged lightguide arrangement. A focusing adjustment in the z-direction is not envisaged, but with regard to design is taken to be given. In a second solution the coupling bodies are configured as a flange. By way of peripherally arranged screws with a different pitch the two flanges on the one hand may be moved to one another in the z-direction and may be adjusted in a desired angular position in the x- and y-direction.

Even though the known coupling devices could carry out all required movements, the adjustment however was still very time-consuming and required suitable experience. This lies in the fact that with the known solutions the singular adjustment as well as the parallel displacement within the xy-plane is to be effected by way of the same screws. Thus with the state of the art it was unavoidable that also a slight shifting was effected with the angular adjustment. As a result, this slight displacement out of the axis has often been accepted in order to avoid a renewed adjustment, possibly again with the adjustment of the angular position.

SUMMARY OF THE INVENTION

It is therefore the object of the present invention to provide a device with which the angular position adjustment and the parallel displacement of coupling bodies on the input and output sides relative to one another may be carried out separately.

This object is achieved by a device for optically coupling an arriving light beam from any optical component, with a further-transmitting light-guiding fiber, containing in each case an input side and output-side coupling body with in each case a centric lead-through for leading through the light, wherein in the device there is arranged at least one lens or a lens system, characterized in that between the input-side and the output side coupling body there is arranged an intermediate coupling body with a centric lead-through, which in one of the input-side or output-side coupling bodies is displaceably and lockably held in one plane, whilst the other input-side or output-side coupling body on the intermediate coupling body is mounted in an elastic pivotally movable and axially displaceable manner.

BRIEF DESCRIPTION OF THE DRAWINGS

Embodiments of the subject-matter of the invention, and their significance is explained in the subsequent description with reference to the accompanying drawings.

There are shown in:

FIG. 4 shows a view of the side of the coupling device according to the invention on the output side, according to one of the FIGS. 1–3.

DETAILED DESCRIPTION OF THE INVENTION

Figure 1:
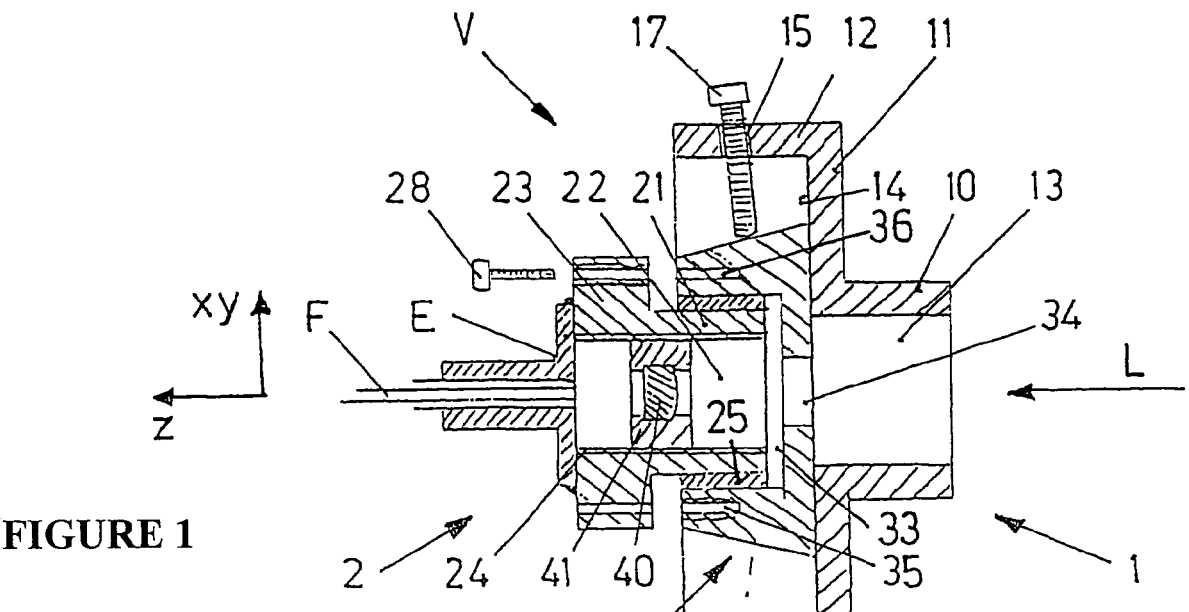
FIG. 1 a vertical section through a device according to the invention, wherein on the input side a light beam arriving from a laser apparatus is fed into a lightguide fiber on the output side.

The entire device according to the invention, for optically coupling an arriving light beam from any optical component to a further-transmitting, light-guiding fiber F is indicated here at V. The optical coupling device V, whose first embodiment example is shown in FIG. 1, has three main components. There are an input-side coupling body 1, an output-side coupling body 2 and a coupling body arranged between these, which is indicated as an intermediate coupling body 3. Since the terms "output-side coupling body" and "input-side coupling body" may always be interchanged, hereinafter in the description one mostly only speaks of coupling bodies if one of these two elements is meant, whilst the element lying there between is always indicated as an "intermediate coupling body". The input-side coupling body 1 in its shape is practically only dependent on how the optical components on the input side look. The light source, in particular a laser apparatus, a beam splitter or an input-side lightguide fiber are considered as optical components.

The input-side coupling body 1 has a tube piece 10 with a terminal flange 11 on whose periphery there is integrally formed a circumferential collar 12. The tube piece 10 simultaneously forms the centric lead-through 13 of the input-side coupling body 1. The surface of the flange 11 delimited by the collar 12 is designed a planar surface 14. This planar surface 15 is manufactured in a highly precise manner and serves as a sliding surface for the intermediate coupling body 3 lying thereon. In the collar 12 there are arranged several, preferably four threaded bores 15 which are distributed uniformly over the circumference and are directed towards the centre. The four threaded bores 15 serve for accommodating two first adjusting screws 17 or two threaded spring pins 19. A fifth threaded bore 16 which is arranged centrally between two neighboring threaded bores 15 serves for accommodating a first locking screw 18.

Figure 4:
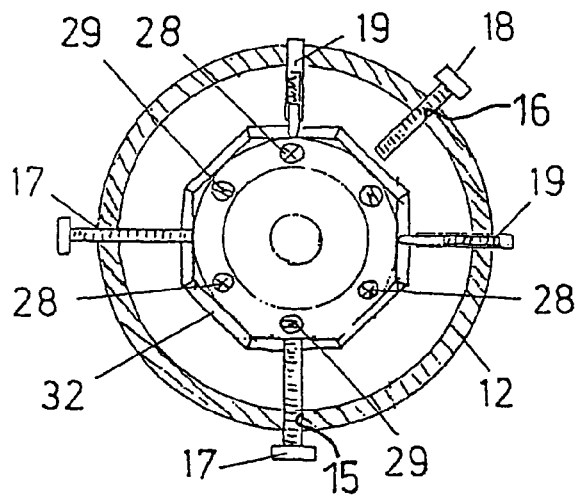
FIG. 4 shows a vertical section through a third embodiment form of a device for coupling two lightguide fibers.

The intermediate coupling body 3 is displaceably arranged lying on the planar surface 14. This intermediate coupling body 3 has the shape of a truncated cone. At the same time it may be the case of a cylindrical truncated cone or a truncated cone with a polygonal base surface. In order to prevent a twisting of the truncated cone 3 on the planar surface 14, one would preferably grind chamfers 32 on its superficies 31 on which the corresponding first adjustment screws 17, first locking screws 18 or threaded spring pins 19 bear. This is most evident from FIG. 4.

The two first adjusting screws 17 are perpendicular to one another so that the one first adjustment screw effects a displacement in the x-axis direction and the other first adjustment screw in the y-axis direction. Arranged diametrically opposite each first adjustment screw is a threaded spring pin 19, wherein the first adjustment screws 17 as well as the threaded spring pins 19 are held in threaded bores 15 which pass through the collar 12 in the direction of the centre axis. A first locking screw 18 is arranged between the two threaded spring pins 19, which likewise is directed towards the centre axis.

The threaded spring pins 19 may also be replaced by other elements, which have the object of producing a repelling force component between the collar 12 and the intermediate coupling body 3 and thus to press the intermediate coupling body 3 onto the first adjusting screws 17. An alternative to the threaded spring pins 19 would e.g. be an elastic mass incorporated in the volume between the collar 12 and the intermediate coupling body 3. Instead of the threaded spring pins 19 however further screws may be applied. This alternative variant thus encompasses three or more screws which are screwed into the threaded bores 15 of the collar and rigidly hold the intermediate coupling body. With this there is no need to differentiate between the adjustment and locking screws. Thanks to the inclined superficies or the inclined ground chamfers 23 the first adjustment screws 17, the first locking screws 18 and the threaded spring pins 19 exert a force component onto the truncated cone 30 which effects the pressing force of the truncated cone 30 onto the planar surface 14. This pressing force may be set practically infinitely by the inclination of the threaded bores 15.

A pocket hole bore 33 is centrically formed in the truncated cone 30 from the upper, smaller surface. In its centre there is provided a centric lead-through 34, preferably also as a cylindrical bore. Centrally mounted, the output-side coupling body 2 engages in this centric pocket hole bore 33. This coupling body also consists of a tube piece 21 which terminates at a terminal flange 23. The tube piece 21 and the terminal flange 23 have a centric lead-through 22. The centric lead-through 22 may comprise an inner thread 24 in which a lens 40 in a lens carrier 40 may be displaced to a greater or lesser extent in the direction of the z-axis by way of screwing.

Between the circumferential inner wall of the pocket hole bore 33 and the tube piece 21 there is arranged an elastic cylinder section 25. This elastic cylinder section 25 may either be designed as a rubber-elastic flexible tubing section, or the inner wall of the pocket hole bore may be coated with a rubber layer which is vulcanized on. The elastic cylinder section 25 permits a slight tilting of output-side coupling body 2 with respect to the intermediate coupling body 3 and thus also with respect to the input-side coupling body 1. Of course the elastic cylinder section 25 may also be replaced by other suitable elastic means, for example by way of a plurality of elastic elements which are distributed along the inner wall of the pocket hole bore 33.

For adjusting the angular position of the output-side coupling body 2 to the input-side coupling body 1, in the flange 23 of the output-side coupling body 2 there are alternating incorporated passage holes 26 and threaded holes 27. Second locking screws 29 may be led through the passage holes 26, which engage into threaded pocket holes 35. Through the threaded holes 27 in the flange 23 there are applied second adjustment screws 28 which in the intermediate coupling body 3 are supported in corresponding pocket holes 36. The thread less passage holes 26 and pocket holes 36 need to be sufficiently wide in order to permit a certain tilting movement of the screws. The tilting movement which is to be carried out is usually very small and is between 0 and a few degrees.

Figure 2:
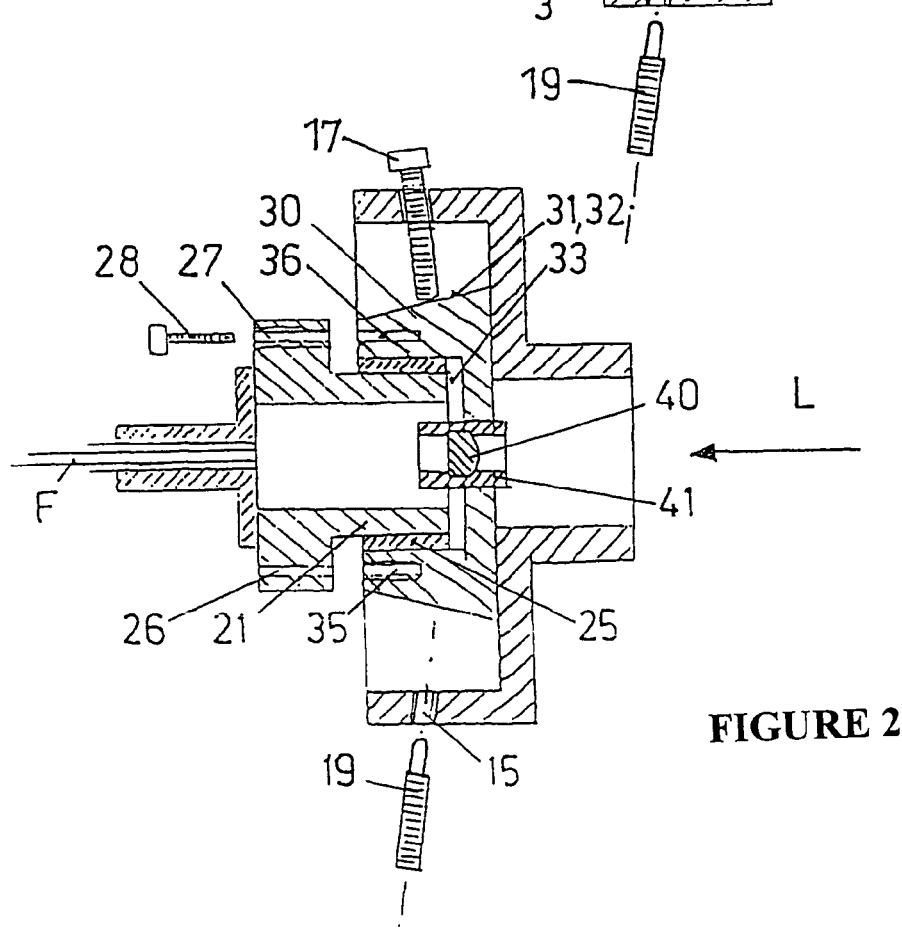
FIG. 2 shows the same view of a second embodiment form of a device of a similar construction type.

As is shown in a second embodiment example illustrated in FIG. 2, a lens 40 in a lens carrier 41 may also be arranged in the central lead-through 34 of the intermediate coupling body 3 in a manner displaceable by screw. The lightguide F is provided with a commercially available end piece E which is fixedly or releasably connected to the output-side coupling body 2.

Figure 3:
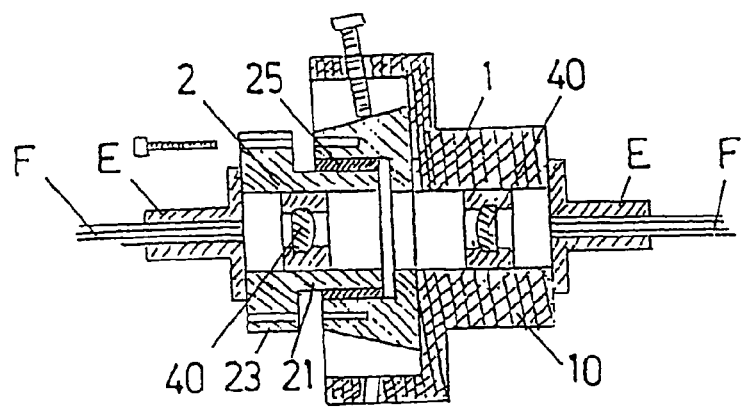
FIG. 3 shows a vertical section through a third embodiment form of a device for coupling two lightguide fibers.

In FIG. 3 there is shown a similar third embodiment form practically analogously to the FIGS. 1 and 2, wherein the input-side coupling body 1 has a thick-walled tube piece 10 whose input-side opening is provided with an end-piece in which a lightguide fiber F is held. The solution shown here thus shows a fiber-to fiber connection. With this one would attach a collimating lens or a collimating lens system 40 in the input-side coupling body 1, and in the oppositely lying tube piece 21 of the output-side coupling body 2 a focusing lens 40 or a focusing lens system. Otherwise in its construction this embodiment form is the same as the solutions according to FIGS. 1 and 2.

Figure 5:
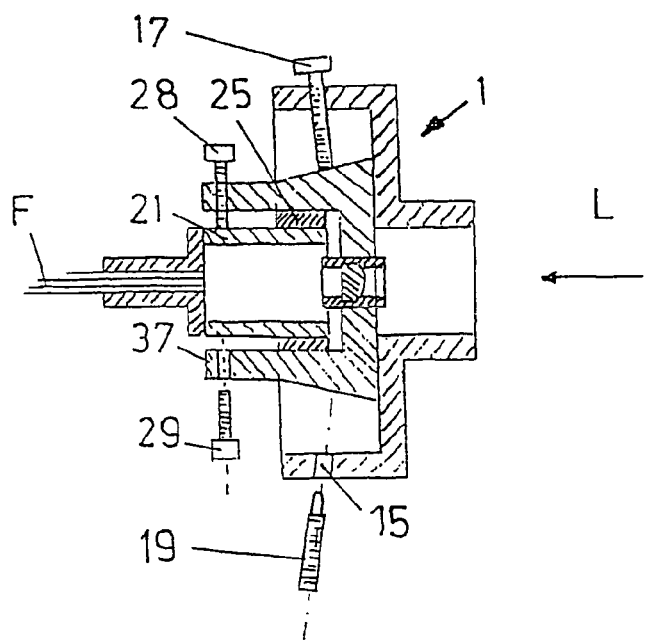
FIG. 5 shows a vertical section through a fourth embodiment form of a coupling device according to the invention, with which the angular adjustment is effected by way of radially directed screws.

In FIG. 5 there is shown a fourth embodiment form with which the intermediate coupling body 3 on the upper cover surface comprises a cylindrical extension 37 which is connected to this. This cylindrical extension 37 is connected to the intermediate coupling body 3 as one piece. This allows the possibility of screwing two adjustment screws 28 and two locking screws 29 radially through this cylindrical extension piece 37 which then act on the tube piece 21 of the output-side coupling body 2. The output-side coupling body 2 in this case requires no terminal flange 23. This solution is accordingly economical. The second adjustment screws 28 and the second locking screws 29 may lie in one plane which most preferably intersects the cylindrical extension 37 perpendicularly. In order to give the device an even greater stability, further (non-drawn) second adjustment and locking screws may be attached which are axially distanced to the second adjustment and locking screws 28, 29 drawn in FIG. 5. The second adjustment and locking screws 28, 29 should be arranged sufficiently distanced from the elastic cylinder section 25 in order to be able to carry out an optimal tilting movement. With the embodiment form shown in FIG. 5 again the arriving light beam L may be led into the light-guide fiber F in an exact alignment in that the parallel displacement and the tilting movement may be carried out independently of one another.

Figure 6:
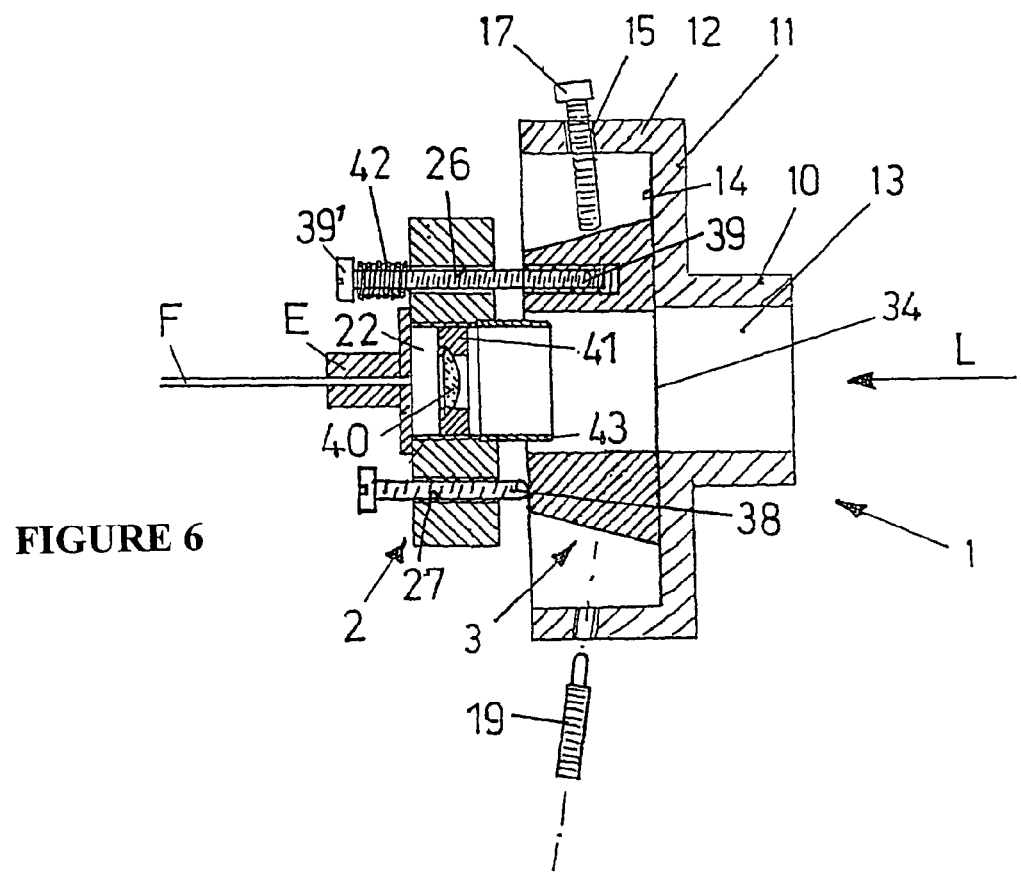
FIGS. 6 shows a vertical section through a fifth embodiment form of a coupling device according to the invention.
Figure 7:
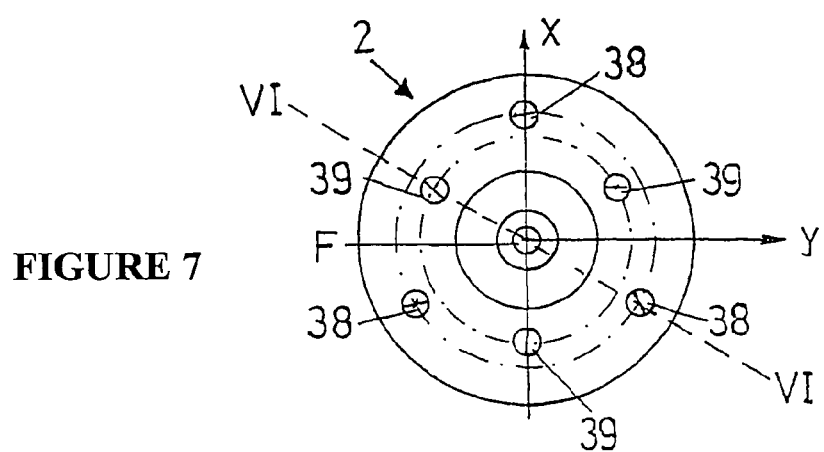
FIG. 7 shows a plan view of the central part of the output side of the coupling device according to FIG. 6.

A further, fifth embodiment form of the device according to the invention is shown in the vertical section in FIG. 6 and in a part plan view in FIG. 7. The output-side coupling body 2 is configured here as a disk with a centric passage bore 22 or as a ring. It is adjustable or lockable with respect to the intermediate coupling body 3 by way of two adjustment screws 38 and two locking screws 39.

For adjusting the angular position of the output-side coupling body 2 there are provided second adjustment screws 38. The second adjustment screws 38 are screwed into corresponding threaded bores 27 in the annular output-side coupling body 2 and are supported on that surface of the intermediate coupling body 3 which faces the output-side coupling body 2. In order to avoid an over-definition one preferably operates with only three second adjustment screws 38. One advantageously distributes these uniformly over the circumference.

The second locking screws 39 in passage bores 26 pass through the annular output-side coupling body 2 and engage into threaded pocket holes 35 in the intermediate coupling body 3. The second locking screws 39 are supported by way of spring elements 42 on the outer side of the output-side coupling body 2. The spring elements 42 are arranged between the screw head 39' of the second locking screws 39 and the output-side coupling body 2. With the spring element 42 it may be the case of a cylindrical compression spring or of several spring disks which form a suitable spring assembly. However elastomeric pressure elements with relatively large compression strength are also considered as spring elements 42, for example plastic rings or plastic disks.

The second locking screws 39 and the spring elements 42 have the object of exerting an attraction force between the output-side coupling body 2 and the intermediate coupling body 3. The second adjustment screws 38 exert a corresponding counter force. By way of this one sets an exact defined angular position of the output-side coupling body 2 with respect to the intermediate coupling body 3. The passage bores 26 which are passed through by the second locking screws 39 must be accordingly designed so wide that the second locking screws 39 in the passage bores 26 permit the required tilting movement of the output-side coupling body 2.

The number of second locking screws 39 does not play a considerable role per se, but one would preferably also provide three second locking screws 39. At the same time in each case a second locking screw 39 is always provided between two adjustment screws 38.

It is advantageous if the second adjusting screw 38 is arranged as far as possible from the centre. By way of this one may effect an even more accurate setting. On the other hand this is not so much required for the second locking screws 39. Accordingly FIG. 7 shows a particularly preferred arrangement form of the second adjustment screws 38 and the locking screws 39.

The embodiment form according to FIGS. 6 and 7 permits practically any distancing of the output-side coupling body 2 to the intermediate coupling body 3 in the z-direction. If a relatively large angular correction is required in the xy-direction, then accordingly the distance in the z-direction between the output-side coupling body 2 and the intermediate coupling body 3 must be sufficiently large in order to permit this tilting movement. This is possible without any problem with the embodiment form according to FIGS. 6 and 7.

It may be advantageous to prevent the penetration of contamination and foreign light from the outside into the device and in particular a dirtying of the lens 40 or of the fiber ends. For this one may realize a type of optical seal for which various solutions are possible. After setting the device e.g. shrinkage flexible tubing may be attached over the device. A further possibility lies in providing a sleeve 43 in the centric passage bore 22 of the output-side coupling body 2, which extends over the gap between the output-side coupling body 2 and the intermediate coupling body 3 and projects into the further centric lead-through bore 34 of the intermediate coupling body 3.

Of course the lens or the lens system 40 may also be arranged in the intermediate coupling body 3. In both variants the lens or the lens system 40 may be held in a lens carrier 41 and the lens carrier 41 may be designed displaceable in the z-direction.

LIST OF REFERENCE NUMERALS

E end piece
F lightguiding fiber
L light beam
V device
1 input-side coupling body
2 output-side coupling body
3 intermediate coupling piece
10 tube piece
11 flange
12 collar
13 central guide on the input-side
14 planar surface
15 threaded bores in the collar
16 threaded bore for locking screw
17 first adjustment screws
18 first locking screws
19 threaded spring pin
21 tube piece
22 centric lead-through
23 terminal flange
24 inner thread 25 elastic cylinder section
26 passage holes
27 threaded holes
28 second adjustment screws
29 second locking screws
30 truncated cone
31 superficies
32 chamfers
33 pocket hole bore
34 centric lead-through in the intermediate coupling body
35 threaded pocket holes
36 pocket holes
37 cylindrical extension
38 second adjustment screws
39 second locking screws
40 lens
41 lens carrier
42 spring element
43 sleeve

The invention claimed is:

1. A device for optically coupling an arriving light beam with a further-transmitting light-guiding fiber, comprising:
    (a) a first and a second coupling body, each of said first and second coupling bodies having a centric lead-through for leading through the light beam; and
    (b) an intermediate coupling body positioned between said first and second coupling bodies and having a centric lead-through for leading through the light beam, wherein the intermediate coupling body is displaceably and lockably held in one plane within the first coupling body, and the second coupling body is mounted in a pivotally and axially displaceable movable manner in the intermediate coupling body, and wherein the first coupling body comprises a planar flange which runs perpendicular to the centric lead-through and is surrounded by a circumferential collar, the circumferential collar being passed through by at least one first adjustment screws and at least one first locking screw, which act on the intermediate coupling body.

2. The device according to claim 1, comprising two first adjustment screws aligned with the enter of the flange, wherein a threaded pin spring is arranged diametrically opposite each of said first adjustment screws as a counter pressure element and is held in the collar.

3. The device according to claim 2, wherein a single first locking screw directed to the center of the flange is present between the two threaded spring pins.

4. The device according to claim 1, wherein the intermediate coupling body is shaped generally as a truncated cone and has a planar base surface which displaceably rests on a planar surface of the flange of the first coupling body.

5. The device according to claim 4, wherein ground chamfers are provided on the superficies of the truncated cone-shaped intermediate coupling body, the ground chamfers acting as rest surfaces for the first adjustment screws and the first locking screws.

6. The device according to claim 4, wherein the first adjustment screws and the first locking screws passing through the collar are arranged such that they lie perpendicular to the superficies of the truncated cone-shaped intermediate coupling body.

7. The device according to claim 1, wherein the intermediate coupling body has a cylindrical receiving bore which is extended with respect to the centric lead-through and in which a cylindrical tube section of the second coupling body is pivotally mounted with the intermediate arrangement of a radially circumferential, elastic cylinder section.

8. The device according to claim 7, wherein the intermediate coupling body is shaped generally as a truncated cone, and the second coupling body mounted in the intermediate coupling body comprises a flange which is passed through by three second locking screws which engage into threaded holes on the upper surface of the truncated cone-shaped intermediate coupling body, and by three second adjustment screws in threaded holes in the flange which are supported directly on the upper surface of the truncated cone-shaped intermediate coupling body.

9. The device according to claim 8, wherein the three second adjustment screws in threaded holes in the flange are supported in pocket holes.

10. The device according to claim 7, wherein the intermediate coupling body comprises a cylindrical extension connected to an upper cover surface of the intermediate coupling body, the cylindrical extension having a lead-through which is axially flush with the lead-through in the intermediate coupling body, and wherein the second coupling body is held pivotally movably therein by way of second adjustment screws.

11. The device according to claim 10, wherein the second coupling body is fixed in position by second locking screws.

12. The device according to claim 1, wherein the second coupling body is designed essentially as a disk and is passed through by three second locking screws which are resiliently supported on the second coupling body, and are connected in screw connection to the intermediate coupling body, and wherein three peripheral adjustment screws are present which are held in screw connection in the second coupling body in a freely movable manner, and are supported on the intermediate coupling body.

13. The device according to claim 1, wherein at least one lens is arranged in the device.

14. The device according to claim 1, wherein one of the first and second coupling bodies is designed as a bulk head for connection to a laser light source and at least one collimating lens is arranged in the other of the first and second coupling bodies.

15. The device according to claim 1, wherein a lightguide fiber connects to each of said first and second coupling bodies, the first coupling body is an input-side coupling body in which there is arranged a collimating lens, and a focusing lens is arranged in the intermediate coupling body.

16. The device according to claim 1, wherein one of the first and second coupling bodies is designed as a bulk head for connection to a laser light source and at least one collimating lens is arranged in the intermediate coupling body.

17. The device according to claim 1, wherein a lightguide fiber connects to each of said first and second coupling bodies, the first coupling body is an input-side coupling body in which there is arranged a collimating lens, the second coupling body is an output-side coupling body, and a focusing lens is arranged in the output-side coupling body.

* * * * *

UNITED STATES PATENT AND TRADEMARK OFFICE
CERTIFICATE OF CORRECTION

PATENT NO. : 7,128,473 B2
APPLICATION NO. : 10/416821
DATED : October 31, 2006
INVENTOR(S) : Daniel Fluck et al.

It is certified that error appears in the above-identified patent and that said Letters Patent is hereby corrected as shown below:

Title Page item 73, Please change Assignee from "DVL Lasers and Electronics GmbH" to "LINOS Photonics GmbH & Co. KG"

Signed and Sealed this

First Day of June, 2010

David J. Kappos
*Director of the United States Patent and Trademark Office*